(12) United States Patent
Radice et al.

(10) Patent No.: US 10,309,474 B2
(45) Date of Patent: Jun. 4, 2019

(54) AUTOMATED FINISHING STATION FOR A BRAKE PAD

(71) Applicant: ITT Italia S.r.l., Lainate (IT)

(72) Inventors: Carlo Radice, Barge (IT); Augusto Carusi, Barge (IT)

(73) Assignee: ITT Italian S.r.l. (IT)

( * ) Notice: Subject to any disclaimer, the term of this patent is extended or adjusted under 35 U.S.C. 154(b) by 0 days.

(21) Appl. No.: 15/323,160

(22) PCT Filed: Mar. 25, 2016

(86) PCT No.: PCT/IB2016/051725
§ 371 (c)(1),
(2) Date: Dec. 30, 2016

(87) PCT Pub. No.: WO2016/151547
PCT Pub. Date: Sep. 29, 2016

(65) Prior Publication Data
US 2017/0138428 A1 May 18, 2017

(30) Foreign Application Priority Data
Mar. 25, 2015 (IT) .................... 102015098011

(51) Int. Cl.
B23B 5/02 (2006.01)
B24B 7/16 (2006.01)
(Continued)

(52) U.S. Cl.
CPC ............. F16D 69/02 (2013.01); B23B 5/00 (2013.01); B23B 5/02 (2013.01); B23Q 7/047 (2013.01);
(Continued)

(58) Field of Classification Search
CPC .... B23B 5/00; B23B 5/02; B23B 5/04; B23Q 7/047; B25J 11/0065; F16D 2250/0092;
(Continued)

(56) References Cited

U.S. PATENT DOCUMENTS 5,040,338 A * 8/1991 Schwar .................. B24B 7/17
451/269
5,054,243 A * 10/1991 Rex ...................... B24B 19/28
451/188
(Continued)

FOREIGN PATENT DOCUMENTS

DE 2837873 A1 3/1980
FR 2985796 A1 7/2013
GB 724426 A 2/1955

OTHER PUBLICATIONS

European Patent Office (ISA/EP), International Search Report and Written Opinion from PCT Application No. PCT/IB2016/051725 dated Jun. 29, 2016.

Primary Examiner — Eileen P Morgan
(74) Attorney, Agent, or Firm — Barclay Damon, LLP

(57) ABSTRACT

An automated station (1) for the finishing of brake pads (4) comprises at least one rotary finishing tool (2) for finishing a friction layer (22) of the brake pad (4), a workhead (3) to pick, retain and release the brake pad (4), a handling unit (6) to move the workhead (3) along a programmable path comprising a pass over the rotary finishing tool (2) and a guide (5) having a mouth (27) which is passed through by the workhead (3) in order to start the finishing pass along the length of the programmable route, the guide (5) contacting the workhead (3) to define, along at least one direction (A; C), the relative position between the workhead (3) and the brake pad (4) during the finishing carried out by the rotary finishing tool (2).

10 Claims, 3 Drawing Sheets

(51) Int. Cl.
*B24B 19/28* (2006.01)
*F16D 69/02* (2006.01)
*B23B 5/00* (2006.01)
*F16D 65/092* (2006.01)
*B23Q 7/04* (2006.01)
*B25J 11/00* (2006.01)
*F16D 69/00* (2006.01)

(52) U.S. Cl.
CPC ............... *B24B 7/16* (2013.01); *B24B 19/28* (2013.01); *B25J 11/0065* (2013.01); *F16D 65/092* (2013.01); *F16D 2069/004* (2013.01); *F16D 2200/0008* (2013.01); *F16D 2250/0092* (2013.01)

(58) Field of Classification Search
CPC .... B24B 7/06; B24B 7/16; B24B 5/06; B24B 5/065; B24B 19/28
USPC ................................. 451/5, 11, 12, 278, 902
See application file for complete search history.

(56) References Cited

U.S. PATENT DOCUMENTS

| | | | |
|---|---|---|---|
| 8,398,455 B2* | 3/2013 | Schmitz | B24B 27/0076 451/49 |
| 8,684,791 B2* | 4/2014 | Stern | B24B 7/228 451/11 |
| 2002/0174752 A1* | 11/2002 | Baldwin | B23B 5/02 82/165 |
| 2005/0086808 A1* | 4/2005 | Potter | B23B 5/02 29/898.07 |
| 2010/0255758 A1* | 10/2010 | Lorenzen | B24B 1/04 451/28 |
| 2012/0220194 A1* | 8/2012 | Maloney | B24B 27/0038 451/5 |
| 2013/0130593 A1* | 5/2013 | Kalenian | B24B 49/00 451/5 |

* cited by examiner

AUTOMATED FINISHING STATION FOR A BRAKE PAD

CROSS REFERENCE TO RELATED APPLICATIONS

This application is a national phase application claiming priority under relevant portions of 35 USC § 119 and 35 USC § 371 to PCT Application No. 2016/051725, filed 25 Mar. 2016, which claims priority to IT 102015000009801, filed 25 Mar. 2015. The entire contents of each noted application are herein incorporated by reference.

TECHNICAL FIELD

The present invention relates to an automated finishing station for a brake pad.

BACKGROUND ART

A brake pad comprises a support plate, preferably metal, obtained by punching, sintering or the like, and a layer of friction material adhering to the support plate.

After compaction and/or cross-linking and/or hardening of the friction material in the kiln, the friction layer must be finished to meet the geometric mounting tolerances on a brake caliper.

The finishing operation is carried out with rotary tools, such as grinders or milling cutters, which apply an action on the friction layer of a certain entity. Such action must be opposed in order to reduce the geometrical tolerances of the friction layer after the finishing. This requirement is particularly important because the shape and dimensions of the friction material must meet very tight tolerances required on the brake pad design. The finishing includes in particular the adjustment that allows the flatness of the surfaces delimiting the frictional layer to be defined. The finishing also comprises further abrasion operations for the removal of material carried out by means of milling cutters, also disk milling cutters, or grinders. For example, the finishing operation may comprise the realization of a groove in the friction layer by means of a disk milling cutter or grinder to subdivide a contact surface of the friction layer selectively cooperating in use with the brake disc into two or more areas.

Furthermore, the geometry of the friction layer may vary. After the finishing, the friction layer presents a main flat face substantially parallel, in use, to a brake disc. At the sides of the flat face, the friction layer may also present zones of variable thickness, in particular decreasing from the center of the pad towards the ends and/or the periphery. These zones are delimited by faces facing, in use, the disc and defining chamfers, for example flat chamfers, at constant angle. The chamfers may have different profiles, and present, for example, a sequence of flat faces at different inclinations to one another or a curvilinear 'J' form. It is therefore important that the finishing station is flexible to allow the creation of a variety of friction layer geometries.

DISCLOSURE OF INVENTION

The purpose of the present invention is to provide an automated finishing station that is able to meet at least in part the requirements specified above.

The purpose of the present invention is achieved by means of an automated finishing station according to claim 1.

BRIEF DESCRIPTION OF THE DRAWINGS

The invention will now be described with reference to the accompanying drawings, which illustrate examples of non-limiting embodiments and refer to.

BEST MODE FOR CARRYING OUT THE INVENTION

Figure 1:
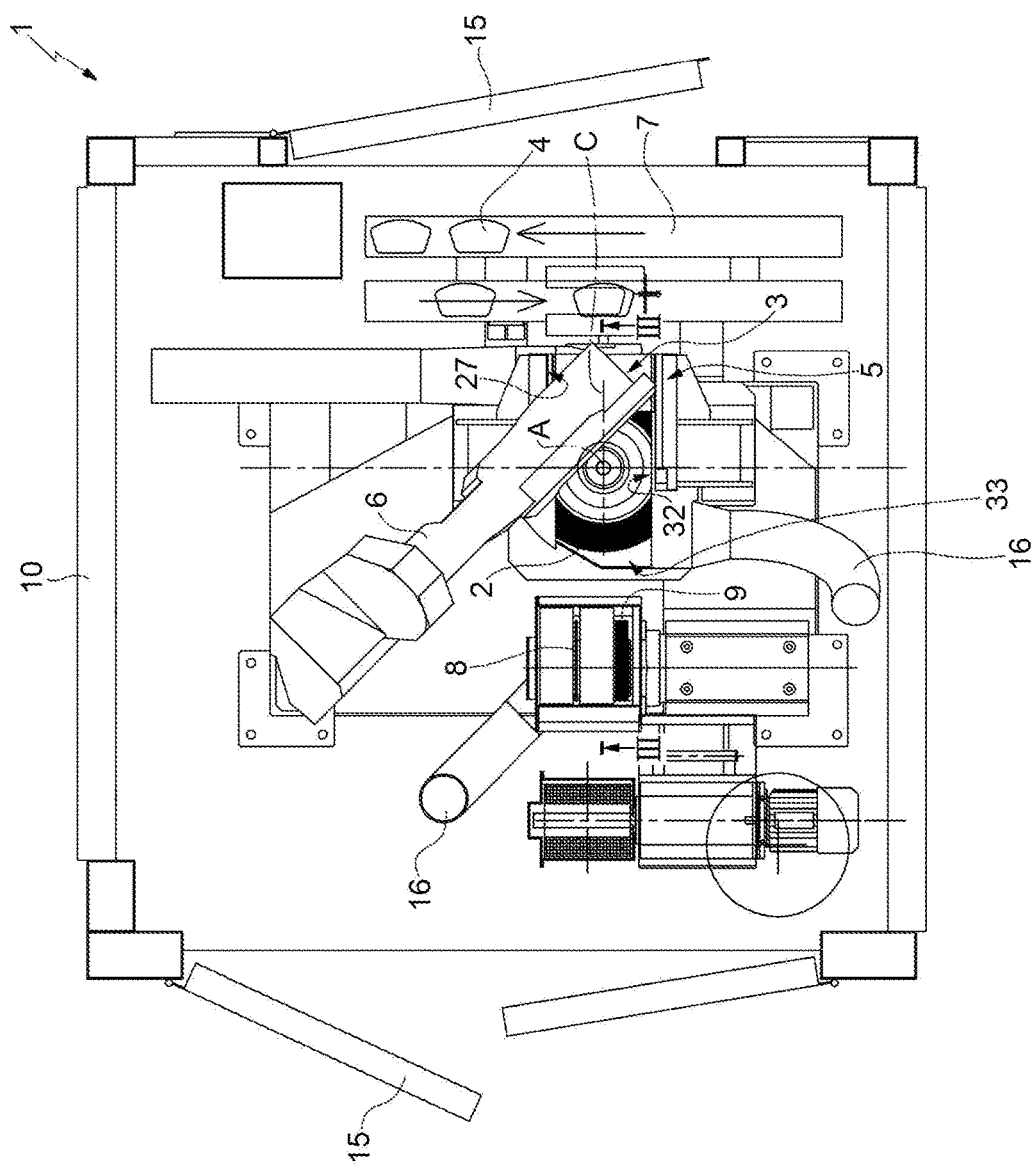
FIG. 1 a plan view of an automated finishing station according to claim 1.

Illustrated in FIG. 1 with 1, as a whole, is an automated station for the finishing of a brake pad comprising a rotary finishing tool 2, for example a flat grinder with a vertical axis A, a workhead 3 to pick, retain and release a brake pad 4 and a guide 5 on which the workhead 3 leans during a finishing step carried out by the grinder 2. The guide 5 is fixed and presents an optionally adjustable position. The workhead 3 is moved by a handling unit 6 preferably comprising an articulated arm and, still more preferably, a 6-axis robotic arm, in particular anthropomorphic. The handling unit 6 is flexible and programmable to allow the movement of the workhead 3 along various trajectories or paths different from one another and dependent on the type of finishing operation and/or on the brake pad 4 model.

Optionally, alternatively or in any combination, the automated station 1 also comprises a conveyor 7, for example a conveyor belt, to bring the brake pads 4 before and after the finishing step, one or more further rotary finishing tools 8 and 9, for example a cylindrical disc grinder for grooving and a disc grinder with a shaped profile, for example rounded, and a soundproof cabin 10 within which the mobile elements of the finishing station 1 are housed.

The cabin 10 is also closed by means of doors 15 for access of operators for the maintenance and defines a closed and sealed volume within which aspirators 16 pick the finishing processing residues, in particular powders.

Figure 2:
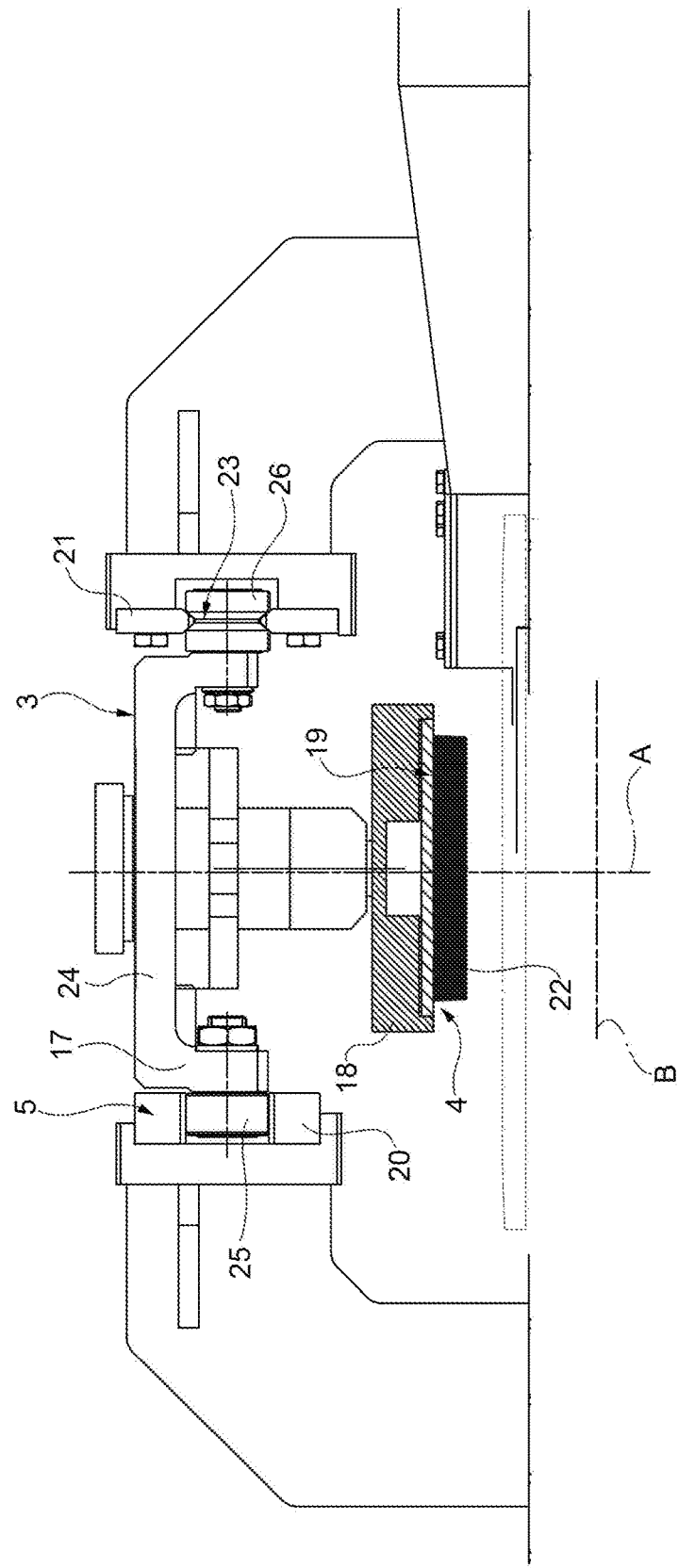
FIG. 2: a front view of a detail of FIG. 1 with parts removed for clarity.

FIG. 2 illustrates in greater detail the workhead 3 and the guide 5. In particular, the workhead 3 comprises a slide or trolley 17 and a gripping device 18 to pick the brake pad 4 from the conveyor 7, retain the brake pad 4 during the finishing along the programmable path and release the brake pad 4 on the conveyor 7 after the finishing. The gripping device 18 can be magnetic or electromagnetic to attract a support plate 19 of the brake pad 4 made of ferromagnetic material, or it can be pneumatic with suction. In a further embodiment, the gripping device 18 is mechanical and includes calipers that tighten to withdraw the brake pad 4. In all cases, the gripping device 18 rigidly retains the brake pad 4 to the workhead 3 so as to avoid displacements of the brake pad 4 during the finishing on the grinder 2.

The guide 5 and workhead 4 are in contact during the finishing so that the action of the grinder 2 on the brake pad 4 is opposed along at least one direction. The action of the grinder 2 on the brake pad 4 is opposed by the contact between the workhead 3 and the guide 5 closing down the plays and defining a constraint able to meet the tolerances. During the finishing, the grinder 2 applies on the brake pad 4 and, therefore, on the workhead 3 wherein the brake pad 4 is anchored, a twisting moment acting around the axis A due to the rotation of the grinder 2 and/or a tilting moment around an axis B perpendicular to the plane containing both the axis A and a feed direction C of the workhead 3 during the finishing on the grinder 2. These actions tend to modify the relative position between the brake pad 4 and the grinder 2 and this adversely impacts the accuracy of the finishing. According to the embodiment of the present invention, the guide 5 comprises two tracks 20, 21 opposite with respect to axis A and parallel to the feed direction C. The workhead 3 contacts the guide 5 in at least three misaligned zones or points defining a plane parallel to which the grinder 2 acts on a friction material 22 of the brake pad 3 during the finishing. Furthermore, to define an effective constraint against tilting moments, the guide 5 is double-acting. According to the creation example of FIG. 2, the guide 5 defines the position of the workhead 3 both when a load is applied by the grinder 2 toward the workhead 3 and vice versa along a direction parallel to axis A.

In addition, the workhead 3 or the guide 5 comprise one or more restrictions 23 in order to avoid the hunting of the workhead 3 with respect to the feed direction C.

According to the embodiment of FIG. 2, the workhead 3 comprises a trolley 24 provided with two pairs of rollers 25, 26. The rollers 25 are cylindrical and run on flat faces of the tracks 20 and the rollers 26 define the restrictions 23. Accordingly, the track 21 presents a shaped profile in order to engage with the restrictions 23 of the respective rollers 26 in order to prevent the hunting of the workhead 3.

Figure 3:
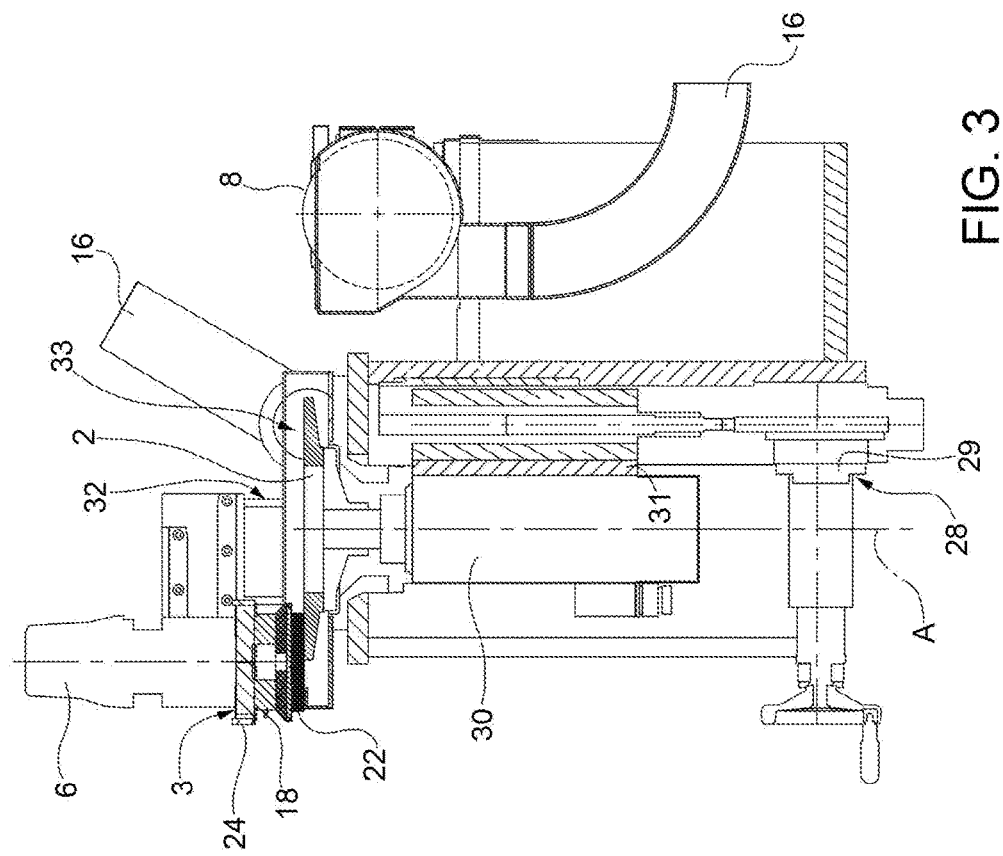
FIG. 3: a section according to the plane III-III of FIG. 1 with parts removed for clarity.

In FIG. 3, the workhead 3 has passed through a mouth 27 (FIG. 1) of the guides 5 and the friction material 22 is being processed on the grinder 2. The mouth 27 faces the conveyor 7. During finishing, the distance along the axis A between the workhead 3 and the grinder 2 is constant and the axis A is fixed. However, provided is an adjustment device 28 to change the position of the grinder 2 with respect to the guides 5. Preferably, the device is manual and comprises a gear 29 and a screw—nut screw 29 driven by the gear 28. Furthermore, a motor 30 of the grinder 2 is mounted on a slide 31 handled by the screw—nut screw 29. The latter can be only handled by the gear 29 and, on the contrary, remains locked when a load is applied on the grinder 2 along the axis A downwards or upwards.

Figure 4:
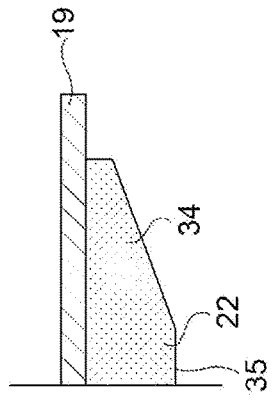
FIG. 4: a longitudinal section of a brake pad.
Figure 5:
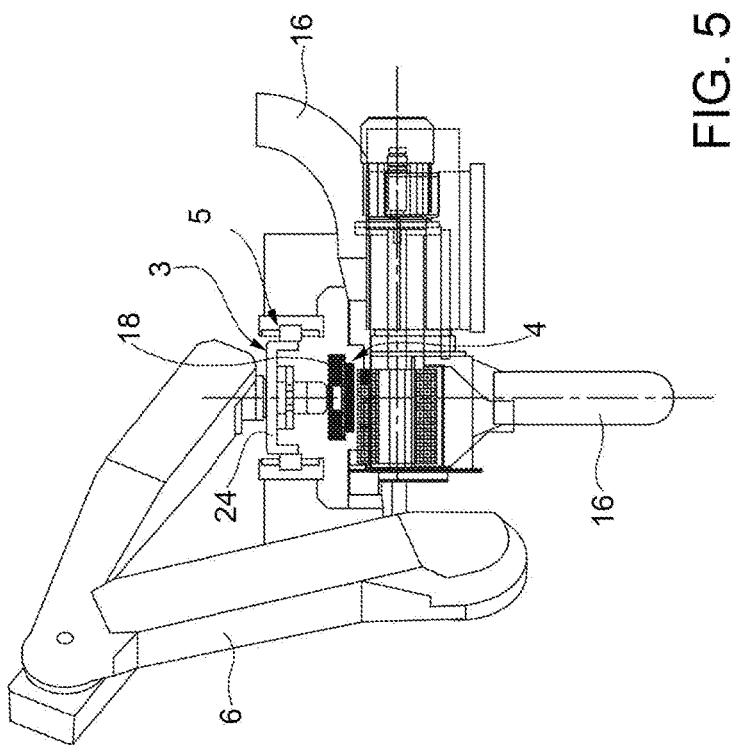
FIG. 5: a rear view of FIG. 1 with parts removed for clarity.

In addition, the grinder 2 projects with respect to an exit opening 32 of the guides 5 so as to define a working zone 33 in which the workhead 3 can be orientated by the anthropomorphic arm 6 independently from the guide 5 and, at the same time, allow the grinder 2 to finish the friction layer 22 to create, for example, a flat chamfer 34 (FIG. 4) flanked to a main face 35 parallel in use to a brake disk of a vehicle. Preferably, the chamfer 34 is created by means of the joints or hinges of the anthropomorphic arm 6 that allow an inclination of the brake pad 4 with respect to the grinder 2 when the 3 workhead has come out from the outlet 32 of the guide 5. More generally, the anthropomorphic arm 6 is programmable to orient the workhead 3 with respect to the grinder 2 in a first position thanks to the guide 5 and in a second position different from the first position when the workhead 3 is located in the working zone 33 and the brake pad 4 contacts the grinder 2.

The trajectory followed by the workhead 3 is programmable so as to carry out chamfers with different inclinations and/or on brake pads 4 having different dimensions and/or geometries. In addition, if required by the specific model of the brake pad 4, before or after the creation of the chamfer 34, the anthropomorphic arm 6 is programmable to lead the workhead 3 along a path that involves the creation, by means of the disk grinder 8, of a rectilinear groove in the friction layer 22. This groove can be parallel to a plane of symmetry of the brake pad 4 or be inclined with respect to this plane. Furthermore, where the chamfer 34 is not flat, the anthropomorphic arm 6 is programmable for controlling the workhead 3 along a further path directed towards the shaped grinder 9, after the workhead 3 has passed through the exit opening 32 and is disengaged from the guide 5.

In use, the anthropomorphic arm 6 can be programmed to carry out in succession a first pass over the main face 35 after the workhead 3 has passed through the mouth 27 and is engaged with the guide 5; at least one further finishing operation, comprising for example the creation of the chamfer 34 by means of the grinder 2 and/or other finishings made by means of the tools 8, 9, after the workhead 3 has passed through the exit opening 32 and is disengaged from the guide 5; and a second pass over the main face 35 after the workhead 3 has passed through the exit opening 32 and has engaged with the guide 5. Therefore, the second pass is in the opposite direction of the first pass. This way it is possible to terminate the work cycle towards the conveyor 7 where the finished brake pad is unloaded and a still unfinished brake pad is taken away.

The advantages that the automated station 1 according to the present invention allows us to obtain are the following.

A handling unit 6 programmable for controlling the workhead 3 along several three-dimensional paths can present a structure whose plays are too high and/or whose overall stiffness is too low to obtain a high finishing accuracy, in particular on the main face 35 of the brake pad 4. Through the interaction of 3 workhead with the guides 5 during the pass over the main face 35, it is possible to obtain a high precision. In addition, the automated station 1 allows the creation of even small batches of different brake pads 4 models since the path of the workhead 3 is programmable for each brake pad 4 model.

The automated station is also of simple construction since the axes of the rotary finishing tools 2, 8, 9 are fixed during machining and, to create the flat chamfer 34, the rotary finishing tool 2 is used, which has a flat work surface. The conical rotary finishing tools are avoided in this way. Moreover, it was verified that the resultant of the cutting forces during the finishing, in particular the adjustment of the main face 35 is greater than the resultant of the cutting forces generated during the flat chamfer 34 processing. Therefore the latter can be created, reducing time and costs, through the anthropomorphic arm 6 while the workhead 18 is disengaged from the guide 5.

Finally, it is clear that changes and variations to the automated finishing station 1 according to the present invention can be made without departing from the scope of protection as defined by the appended claims.

The guide 5 can be single effect and therefore define a simple support suitably designed together with the workhead 3 to counteract the action and the loads of the removal of material by the rotary tool 2.

In addition to the realization of the chamfers 34, the station 1 can be programmed to also carry out further processing while the workhead 18 is disengaged from the guide 5. For example a groove (not illustrated) may be carried out which subdivides the main face 35 into symmetrical areas.

The invention claimed is:
1. An automated station, comprising:
  at least one rotary finishing tool sized and shaped to engage a friction layer of a brake pad;
  a workhead having a structure configured to support the brake pad;

a handling unit configured to move the workhead along a programmable path over the at least one rotary finishing tool, the handling unit comprising an articulated arm that engages and moves the workhead along the programmable path; and a guide comprising at least one pair of tracks having a defined spacing therebetween, which is passed through by the workhead in order to start a finishing pass along the programmable path, the guide contacting the workhead to define, in at least one direction, the relative position between the workhead and the at least one rotary finishing tool during a finishing operation.

2. The automated station according to claim 1, wherein the guide includes an exit opening and a mouth, the at least one rotary finishing tool protruding from the exit opening of the guide to define a zone in which the workhead is disengaged from the guide along the programmable path and in which the handling unit orients the workhead with respect to the at least one rotary finishing tool to a finishing position that is different than a finishing position defined by the guide.

3. The automated station according to claim 1, in which the workhead comprises one of a trolley or a slide in contact with the guide during finishing.

4. The automated station according to claim 1, in which one of the workhead or the guide defines at least one restriction in order to prevent twisting of the workhead within the tracks while the workhead is engaged with the guide.

5. The automated station according to claim 1, further comprising an adjustment device to adjust the distance between the guide and the at least one rotary finishing tool.

6. The automated station according to claim 1, in which the position of a rotation axis (A) of the at least one rotary finishing tool is fixed while the friction layer is in contact with the at least one rotary finishing tool.

7. The automated station according to claim 1, in which the at least one rotary finishing tool is flat and in which the at least one direction is parallel to an axis of rotation of the at least one rotary finishing tool.

8. The automated station according to claim 1, wherein the articulated arm tilts the workhead to enable the at least one rotary finishing tool to chamfer the friction material of a supported brake pad.

9. A control method for an automated station according to claim 1, the control method comprising the sequential steps of:

passing the workhead over the at least one rotary finishing tool along a first direction while the workhead is engaged with the guide;

carrying out an additional finishing operation in which the workhead is disengaged from the guide; and passing the workhead over the at least one rotary finishing tool along a second direction opposite to the first direction while the workhead is engaged with the guide.

10. The control method according to claim 9, in which the additional finishing operation comprises the manufacturing of at least a chamfer of the friction layer by the at least one rotary finishing tool.

* * * * *